United States Patent [19]
Fargo et al.

[11] 3,819,441
[45] June 25, 1974

[54] PROCESS FOR MAKING GLASS FIBER PRODUCT USING PHENOLIC BINDER RESINS

[75] Inventors: Harland E. Fargo; Clayton A. Smucker, both of Newark, Ohio

[73] Assignee: Owens-Corning Fiberglas Corporation, Toledo, Ohio

[22] Filed: July 5, 1972

[21] Appl. No.: 268,984

[52] U.S. Cl.............. 156/167, 65/4, 156/181, 156/335, 161/157, 161/170, 161/198, 260/29.3
[51] Int. Cl.............. B32b 17/04, C03c 27/10
[58] Field of Search ........ 156/62.4, 62.8, 335, 62.2, 156/167, 181; 260/29.3; 117/126 GB; 65/3, 4; 161/157, 170, 198

[56] References Cited
UNITED STATES PATENTS

| | | | |
|---|---|---|---|
| 2,785,728 | 3/1957 | Slayter et al.......................... | 156/62.4 |
| 2,902,458 | 9/1959 | Teppema............................. | 260/29.3 |
| 3,300,427 | 1/1967 | Hebert................................ | 117/161 L |
| 3,470,977 | 10/1969 | Shannon............................... | 161/403 |
| 3,546,898 | 12/1970 | Langlois et al. .................... | 156/62.2 |
| 3,666,694 | 5/1972 | Ingram................................ | 260/29.3 |
| 3,704,199 | 11/1972 | Smucker............................. | 156/335 |
| 3,719,616 | 3/1973 | Ingram................................ | 260/29.3 |

*Primary Examiner*—Daniel J. Fritsch
*Attorney, Agent, or Firm*—Staelin & Overman; Patrick P. Pacella

[57] ABSTRACT

An improved method is disclosed for effecting environmental control in the production of a binder-coated fiber and fiber products. Heat-softened material is attenuated into fibers, cooled to a maximum temperature of about 350°F., coated with a binding agent, collected on a suitable conveyor, and heated in an oven to cure the binder. The binding agent is a phenol-aldehyde type resin which has been condensed to an advanced stage such that the condensate is water-insoluble at a pH of 7.5. The condensate is solubilized by adding a small amount of a non-ionic or anionic agent.

2 Claims, 1 Drawing Figure

PATENTED JUN 25 1974   3,819,441
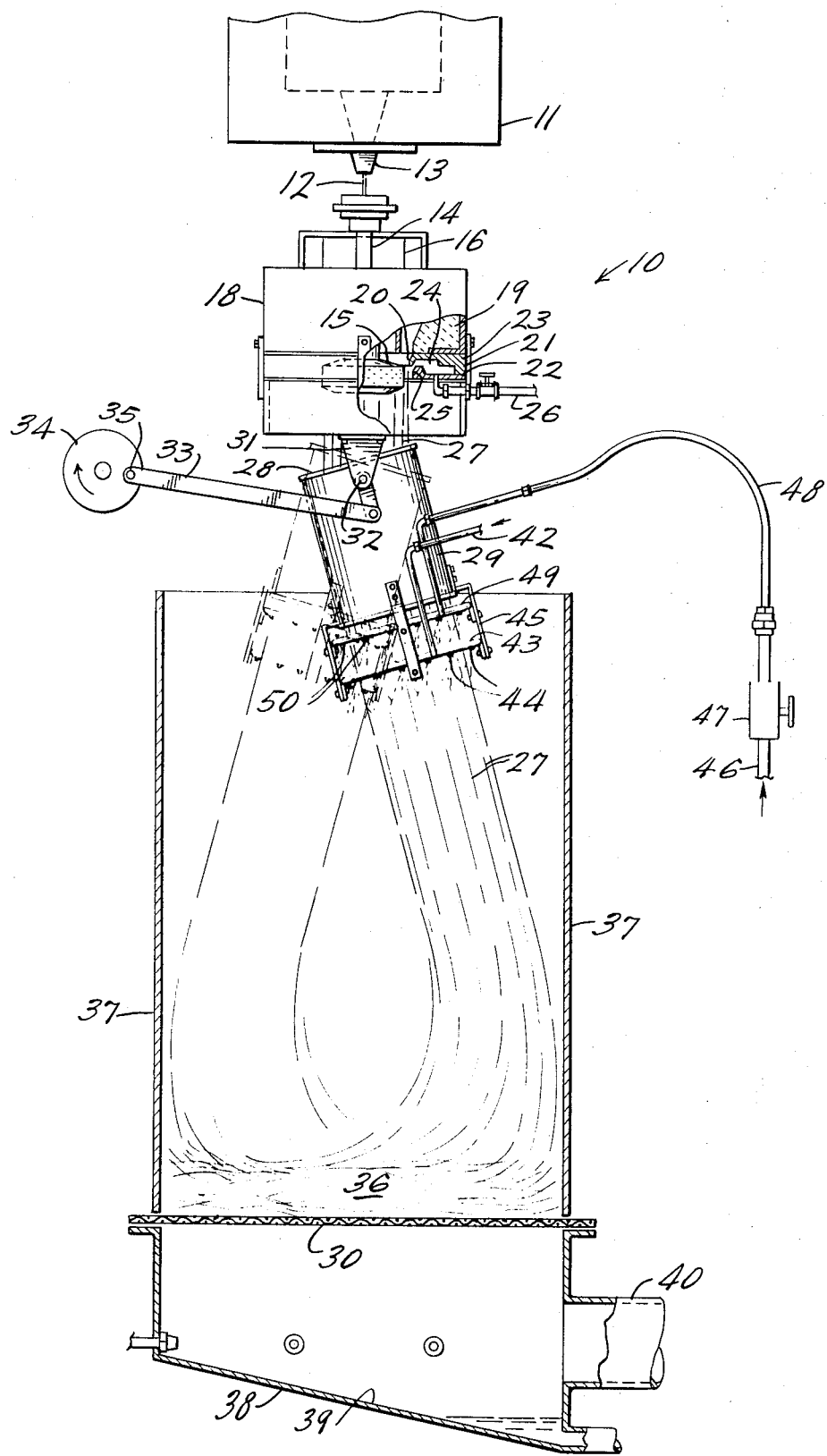

PROCESS FOR MAKING GLASS FIBER PRODUCT USING PHENOLIC BINDER RESINS

BACKGROUND OF THE INVENTION

This invention relates to environmental control during the production of binder-coated fibers and fiber products. Heat-softenable materials such as glass are coated with an "advanced-cure" organic binder after being cooled to a temperature not higher than about 350°F.

One conventional process for forming fibers of glass or other heat-softenable materials, called the rotary process, involves delivering heat-softened or molten glass into a hollow spinner or centrifuge provided with a comparatively large number of orifices in the peripheral wall of the spinner. High speed rotation of the spinner delivers the softened or molten glass through the orifices by centrifugal force. Bodies, streams or primary filaments of glass are produced which are engaged by an annularly-shaped gaseous blast and thereby attenuated into fibers which are entrained in the blast in the form of a hollow beam or column of fibers.

In the fiber-forming operation it has been a usual practice to deliver or apply an uncured binder, such as a phenol-formaldehyde condensate in solution form, to the newly attenuated fibers at a region below the attenuating region so that the fibers are thoroughly coated with the uncured binder. Fibers of this character are collected in a mass upon a moving conveyor. The thickness of the mass is controlled to provide a fibrous mat which is conveyed or passed through an oven or curing zone for setting the binder in the mat.

The descending fibers at the region of application of the binder are at a temperature of 500°F. to 600°F. or more even though the zone of application of the binder onto the fibers is substantially below the attenuating region. The prior art suggests that cooling of the fibers may be accomplished by spraying the attenuated fibers with a vaporizable medium, such as water, prior to the application of the binder resin. Volatilization of the water into steam and subsequent discharge of the steam into the atmosphere is either nonobjectionable, or easily reducible. However, even when the binder is applied to fibers at such a lowered temperature, there is appreciable vaporization of the volatile organic constituent of the binder. These organic vapors when cooled condense into a plume (liquid droplets) which is similar to the mechanism of water vapor condensation into a steam plume. Although the effluent may be washed and filtered, at least some of the vaporized solvent and some binder particles or solids are discharged into the atmosphere through a discharge stack connected through a suction blower arrangement beneath the region of collection of the fibers on the conveyor. As much as 20 percent or more of the binder has been lost in the past through volatilization during application and curing. Because of environmental considerations, discharge of this vapor into the atmosphere is objectionable. Use of the binder of the instant invention provides a major reduction of free phenol in the solids discharge stack and wash water.

It is disclosed in U.S. Pat. No. 3,300,427 that it is desirable to cook a phenol-aldehyde resole resin sufficiently that a high molecular weight resin is produced. However, if the resin cooking step is carried too far, the resin will precipitate out of solution when it is diluted to produce a binder. For example, Pat. No. 3,300,427 discloses cooking a phenol-aldehyde mixture until it would tolerate only a 1:1 dilution with water before precipitation began, and adding an anionic surfactant of the sulfo-acid, i.e., sulfate or sulfonate salt type. Problems encountered with the use of sulfo-acid salts include excessive foaming and stickiness which causes plugging of wash water recirculation systems. It has also been found that sulfo-acid salts are not effective as solubilizers in a phenol-urea-formaldehyde resin system.

SUMMARY OF THE INVENTION

The instant invention is based upon the discovery of an improved method for reducing the vaporization of volatile organic binders during the production of fiber-coated products. Heat-softened material is attenuated into fibers, cooled to a temperature not higher than about 350°F., coated with a binding agent, collected on a conveyor, and heated in an oven to cure the binder. The binder is made from a phenol-aldehyde "advanced-cure" resin. The resin is cooked to an advanced stage, that is, to a more complete degree of reaction, such that the condensate is insoluble at a pH of between 7 and 8. At this stage of reaction, the condensation has proceeded beyond the point of water dilutability. The resin is then made water dispersible by adding a small amount of a anionic or ionic agent.

It is, therefore, an object of the present invention to provide an improved method of producing a fiber-coated product.

Another object of the present invention is to provide an improved method of reducing the volatilization of organic binder ingredients during production of a fiber-coated product.

BRIEF DESCRIPTION OF THE DRAWING

FIG. 1 is a side view in elevation of a rotary fiber forming and distributing unit and collecting means.

In the method of the instant invention, a phenolaldehyde condensate is produced by condensing an aldehyde with phenol in a mole ratio of at least 1.5:1 in the presence of a metal-base condensing agent. The condensate is cured to a stage beyond the point of water dilutability such that the condensate is insoluble at a pH of between 7 and 8. The condensate is made water dispersible by the addition of a non-ionic or anionic agent as a solubilizing agent. The condensate is mixed with other binder ingredients to produce a binder mix. The binder mix is then applied to attenuated glass fibers having a temperature not higher than about 350°F. The binder is applied to the glass fibers such that the binder runs to fiber-to-fiber intersections. The binder-coated fibers are then collected on a conveyor and heated in an oven to cure the binder.

The binder composition used in the instant invention is produced from a phenol-aldehyde resole. The identity of the phenol and the aldehyde that are reacted to produce the resole is of only incidental importance. Accordingly, the resole can be a condensation product of any suitable phenol with any suitable aldehyde (for a discussion of resoles, see Martin, *The Chemistry of Phenolic Resins*, John Wiley & Sons, Inc., New York, 1956, particularly pages 87 through 98, and cited references). As a practical matter, however, a resole curable to an infusible resite is usually preferred for use in connection with vitreous fibers, so that at least a significant amount of a trifunctional phenol, usually hydroxy benzene for economic reasons, is preferably employed, and formaldehyde, for economic reasons and because of the greater simplicity of its chemical reactions with a phenol, is the preferred aldehyde. Most desirably, the resole is produced by reaction of formaldehyde with phenol (hydroxy benzene), and usually in proportions of from 1 mol to 4 mols, preferably, and most desirably of from 2½ mols to 3½ mols of formaldehyde per mol of phenol.

The resin suitable for use in the method of the invention is a phenol-aldehyde resin. Depending upon properties desired in the fiber product, the phenol-aldehyde resin may additionally contain one or more aminoplasts, as for example, melamine, urea, thiourea, and dicyandiamide.

The terms "percent" and "parts" are used herein, and in the appended claims, to refer to percent and parts by weight, unless otherwise indicated.

DESCRIPTION OF THE PREFERRED EMBODIMENTS

EXAMPLE I

A reaction vessel was charged with 27,215 pounds of phenol, and 57,325 pounds of 50 percent formaldehyde. The resulting charge was agitated for a total of 5 minutes. A sample was withdrawn and the refractive index and specific gravity were checked. The refractive index should be in a range of 1.4423 to 1.4426, and the specific gravity should be in a range of from 1.121 to 1.125. A 782 gallon addition of water was charged to the reaction vessel and the reaction mixture agitated for 5 minutes. The charge was then cooked at 110°F. for a period of 2 hours while 2,520 pounds of barium monohydrate was slowly added. After cooking for 2 hours at 110°F., the temperature was raised to 125°F. over a period of one-half hour, and maintained for an additional one-half hour. The reaction mixture was cooked for 1 hour at 125° while an additional 840 pounds of barium monohydrate was charged to the reaction vessel. The temperature was then raised to 150°F. over a period of 1 hour and cooked for an additional 3½ hours. The free formaldehyde present in the reaction mixture was checked. 1,000 pounds of melamine crystals were added over a one-half hour period. The batch was then cooled to 110°F. over a 1/2 hour period before adding 8,200 pounds of urea (solid) as rapidly as possible. The reaction mixture was then cooled to below 100°F. and neutralized to pH 7.2–7.3 with 20 percent or lower sulfuric acid. A 560 pound addition of a solubilizing agent, coconut fatty acid amine, was added to the reaction condensate before cooling to 45°F.

Referring now to the single FIGURE, apparatus 10 is shown for manufacturing binder coated glass fiber wool. Molten glass is delivered from a conventional glass melting furnace (not shown) to a forehearth 11. From the forehearth 11, a stream of molten glass 12 flows by gravity from a feeder 13 through a tubular member or quill 14 into a spinner or hollow rotor 15. The spinner 15 is supported by the tubular member 14 which is journaled to a housing 16. The tubular member 14 and the spinner 15 are rotated at a high speed by means of a conventional electric motor (not shown).

The molten glass 12 flows from the center of the tubular member 14 into the interior of the spinner 15. Centrifugal force caused by the high speed rotation of the spinner 15 urges the molten glass against an orificed peripheral wall 17 of the spinner 15, where the molten glass is extruded through the orificed wall. Glass emitting from the orificed peripheral wall 17 is in the form of streams of glass.

The spinner 15 is surrounded by a circular housing 18 which supports a combustion burner 19. The combustion burner 19 defines an annular combustion chamber 20 which is shaped to direct hot gases from fuel combustion downwardly across the peripheral wall 17 of the spinner 15. The hot combustion gases maintain the streams in a softened condition. The housing 18 also supports a blower 21 comprising an annular body 22 and a cover member 23. The body 22 and cover member 23 define an annular manifold 24 which opens into an annular, downwardly directed throat 25. Compressed air or stream is delivered through a pipe 26 into the manifold 24. The compressed air or steam is emitted as a high velocity gaseous blast from the annular throat 25 to attenuate the streams into fine fibers. The fiberizing region or zone adjacent and immediately below the peripheral wall 17 of the spinner 15 is maintained at a temperature in the range of 1600°F. to 2000°F.

The attenuated fibers below the spinner 15 are in the form of a hollow or tubular veil 27. The veil 27 passes into the upper end 28 of a lapper or bucket 29 which distributes the fibers laterally across the upper flight of a moving foraminous endless belt conveyor 30. The lapper 29 is pivotally attached to the housing 18 by means of a pair of brackets 31 (only one shown) and stub shafts 32. An eccentric comprising a linkage arm 33 connected to a motor driven crank disk 34 by means of a pin 35 swings or oscillates the lapper 29. The lapper 29 is oscillated to uniformly distribute the fiber veil 27 as a mass 36 on the conveyor 30 between the walls of an enclosure 37 extending above the conveyor 30. The mass 36 on the conveyor 30 is conveyed through conventional compacting or sizing apparatus and a curing oven (not shown) where it is formed into a mat or board-like product.

A housing 38 is located below the conveyor 30 for defining a suction chamber 39. The suction chamber 39 is connected through an exhaust pipe 40 and a conventional suction blower (not shown) to an exhaust stack (not shown). The suction chamber 39 is maintained at a sub-atmospheric pressure to cause air to flow from an open upper end 41 of the enclosure 37 downwardly through the collected mass 36 and the foraminous conveyor 30. The downwardly directed flow of air in the enclosure 37 cools the mass of fibers 36 collected on the conveyor 30. Air drawn through the conveyor 30 has been heated by the fiber mass 36 to substantially the same temperature as the fiber mass 36.

After the veil of fibers 27 leaves the lapper 29, it is coated with an organic heat-curable binder, such as the phenol-melamine-urea-formaldehyde binder described in Example I. The binder is delivered through a flexible supply tube 42 to a toroidal manifold 43. The manifold 43 is provided with a plurality of nozzles 44 for directing a spray of binder inwardly and downwardly onto the fiber veil 27. The manifold 43 is preferably attached to or suspended from the lapper 29 by means of a plurality of rigid support brackets 45 such that the manifold 43 moves with the lapper 29 as the lapper 29 is oscillated. The uncooled veil of fibers in the region in which the binder is applied is normally at a temperature of perhaps 500°F. to 600°F. The mass 36 of binder coated fibers collected on the conveyor 30, on the other hand, would normally be at a temperature on the order of 200°F. to 250°F. At these temperatures, a significant amount of the binder resin is vaporized as it contacts the hot glass. The binder vapors are drawn with air into the suction chamber 39 and exhausted to the atmosphere through the exhaust pipe 40 and the stack (not shown). This results in undesirable air pollution and in the loss of binder which can amount to a considerable expense. In addition, the heat of the fibers causes the remaining binder to partially cure before the mass 36 is compacted into mats or board-like products.

In order to use a binder wherein the resin has a high degree of cure, the fiber veil 27 is cooled prior to application of the binder. Cooling is accomplished, for example, by spraying the veil 27 with a vaporizable medium, preferably water. The vaporizable medium is supplied from a pressurized source (not shown) through a pipe 46, a control valve 47, a flexible tube 48 and a toroidal manifold 49. The manifold 49, like the manifold 43, is provided with a plurality of nozzles 50 for directing a spray of atomized particles of the heat vaporizable medium toward the descending fiber veil 27. The manifold 49 may be located at any convenient point between the manifold 43 and the fiberizing region in which the streams are attenuated into fibers. However, it is preferable to locate the manifold 49 between the bottom of the lapper 29 and the binder manifold 43. If the manifold is located in such a position, ordinary tap water may be used for cooling the fiber veil 27. If, on the other hand, the manifold 49 is located above the lapper 29 and near the fiberizing region, it may be necessary to use distilled water due to problems caused by mineral deposits in tap water. The intense heat in this region causes a portion of the spray to vaporize at the nozzles. Mineral deposits left by the vaporized water may eventually clog the nozzles. In addition, mineral deposits may collect on the lapper 29 if distilled water is not used. It will be readily apparent that other vaporizable mediums may be used for cooling the fiber veil 27 to alleviate problems which may occur from mineral deposits when the manifold 49 is located too close to the fiberizing region and the spinner 15. However, the use of other vaporizable mediums will increase the cost of manufacturing the mass 36 and may possibly cause environmental control problems.

Other processes may be used to produce attenuated glass fibers. Streams of molten glass can be drawn from a melting tank through small orifices in bushing tips by downwardly projected blasts of steam from blowers. The blasts of steam cause rapid acceleration and attenuation of the streams of glass to a desired fiber diameter, and projection of the fibers downwardly through a hood onto a foraminous conveyor. A suitable binder composition is applied to the attenuated fibers within the hood.

While the method of the invention is illustrated with fiber-forming units wherein streams of primary filaments of heat-softened material, such as glass, are attenuated into streams or primary filaments, it is to be understood that the method may be used for forming fibers of other heat-softenable materials such as argillaceous rock, slag and the like. The method of the invention is useful when the attenuated fibers are at a temperature not higher than about 350°F. Thus the method is not applicable to heat-softened materials such as plastics.

EXAMPLE II

A reaction vessel was charged with 27,215 pounds of phenol, and 57,325 pounds of 50 percent formaldehyde. The resulting charge was agitated for a total of 5 minutes. A sample was withdrawn and the refractive index and speciifc gravity were checked. The refractive index should be in a range of 1.4423 to 1.4426, and the specific gravity should be in a range of from 1.121 to 1.125. A 782 gallon addition of water was charged to the reaction vessel and the reaction mixture agitated for 5 minutes. The charge was then cooked at 110°F. for a period of 2 hours while 2,520 pounds of barium monohydrate was slowly added. After cooking for 2 hours at 110°F., the temperature was raised to 125°F. over a period of one-half hour, and maintained for an additional one-half hour. The reaction mixture was cooked for 1 hour at 125° while an additional 840 pounds of barium monohydrate was charged to the reaction vessel. The temperature was then raised to 150°F. over a period of 1 hour and cooked for an additional 3½ hours. The free formaldehyde present in the reaction mixture was checked. 1,000 pounds of melamine crystals were added over a one-half hour period. The batch was then cooled to 110°F. over a one-half hour period before adding 8,200 pounds of urea (solid) as rapidly as possible. The reaction mixture was then cooled to below 100°F. and neutralized to pH 7.2–7.3 with 20 percent or lower sulfuric acid. A 510 pound addition of a solubilizing agent, non-ionic polymethacrylate, was added to the reaction condensate before cooling to 45°F.

The resin dispersions prepared as described in Examples I and II were used to produce a binder composition containing dicyandiamide by charging to a mixing tank, provided with a propeller-type agitator, the ingredients listed in Table I. The water content of the binder composition can be adjusted as desired to provide a solids content in the range of from about 3–30 percent solids, depending on the properties desired in the binder-coated fiber and fiber-product.

The binder compositions were sprayed into a forming zone through which glass fibers were being projected onto a foraminous conveyor. The fibers were collected in the form of a wool-like mass associated with the binder composition. Cure was accomplished in an oven maintained at a temperature of about 400°F. through which the glass fibers and associated binder were passed in a period of about 5 minutes, and within which the mass was compressed sufficiently that a board-like product was produced.

TABLE I

| INGREDIENTS IN ORDER OF ADDITION | BONDING SOLIDS RATIO | ADDITIVES (PERCENT BASED ON BONDING SOLIDS) |
|---|---|---|
| Water | | |
| Sodium Hexametaphosphate | | 1.0 |
| Ammonium Sulfate | | 0.5 |

TABLE I—Continued

| INGREDIENTS IN ORDER OF ADDITION | BONDING SOLIDS RATIO | ADDITIVES (PERCENT BASED ON BONDING SOLIDS) |
|---|---|---|
| Boric Acid | | 1.3 |
| Silicone | | 0.2 |
| Dicyandiamide | 20.0 | |
| Bone Glue | 10.0 | |
| Ammonia | | pH 9.5 |
| Resin | 70.0 | |
| Oil Emulsion | | 4.6 |
| Red Dye | | 0.14 |
| Polyglycol | | 1.0 |

Further binder compositions, containing dicyandiamide and urea, respectively, are listed in Tables II–IV.

TABLE II

| INGREDIENTS IN ORDER OF ADDITION | BONDING SOLIDS RATIO | ADDITIVES (PERCENT BASED ON BONDING SOLIDS) |
|---|---|---|
| Water | | |
| Dicyandiamide | 35.0 | |
| Sodium Hexametaphosphate | | $0.8 \pm 0.1$ |
| Ammonium Sulfate | | $0.2 \pm 0.1$ |
| Silicone | | $0.2 \pm 0.1$ |
| Ammonia | | to final pH $9.5 \pm 0.5$ |
| Resin | 65.0 | |
| Oil Emulsion | | $2.0 \pm 0.1$ |

TABLE III

| INGREDIENTS IN ORDER OF ADDITION | BONDING SOLIDS RATIO | ADDITIVES (PERCENT BASED ON BONDING SOLIDS) |
|---|---|---|
| Water | | |
| Sodium hexametaphosphate | | .75 |
| Ammonium Sulfate | | .75 |
| Silicone | | $.20 \pm .05$ |
| Urea | 20.0 | |
| Ammonia | | to pH $9.5 \pm 0.5$ |
| Resin | 80.0 | |
| Oil | | $10.0 \pm 0.5$ |

TABLE IV

| INGREDIENTS IN ORDER OF ADDITION | BONDING SOLIDS RATIO | ADDITIVES (PERCENT BASED ON BONDING SOLIDS) |
|---|---|---|
| Water | | |
| Sodium Hexametaphosphate | | .75 |
| Ammonium Sulfate | | .75 |
| Silicone | | 0.1 |
| *Red Dye Dispersion | | $2.75 \pm .25$ |
| Urea | 20.0 | |
| Ammonia | | to pH $9.5 \pm 0.5$ |
| Resin | 80.0 | |
| Oil | | $19.0 \pm 3.0$ |

* Nominal value may be adjusted upward or downward to match standard.

When the binder compositions as described in Table I–IV are used in conjunction with wash water systems, the binders require addition of about 1 pound per hour of sodium hexametaphosphate and sufficient ammonia to keep the pH at about 8.5. This helps to maintain clean shaker screens and forming chains.

Water emulsifying or solubilizing agents function by a mechanism attributed to the presence within the molecule or ion, of one group that is hydrophobic toward the dispersing medium and, at a suitable distance, another group that is hydrophilic toward the dispersing medium. Anionic type solubilizers include carboxylate ions in which the carboxyl group is attached directly to the hydrophobic portion or through an intermediate linkage such as an ester, amide or amine. Non-ionic solubilizers are organic compounds containing groups of varying plurality that provide hydrophilic character to some parts and hydrophobic character to other parts of the same molecule. With this type, no ionization of the molecule occurs as it does with the anionic type solubilizers.

Examples of solubilizers suitable for use in the instant invention include oxyethylated straight chain phenols, salts of polycarboxylic acids, free acid of organic phosphate esters, pentasodium salt of diethylenetriamine, pentaacetic acid, polyoxyethylenealkylarylethers, polyoxyethylene sorbitan monolaurate, and the sodium salt of a polymeric carboxylic acid.

What we claim is:

1. In a method for producing a glass fiber product which includes the steps of flowing a plurality of streams of molten glass, attenuating the streams to a desired fiber diameter, projecting the fibers onto a suitable conveyor, cooling the fibers as they are being projected onto the conveyor to a temperature not higher than about 350°F, associating a binder with the fibers, and conveying the collected fibers and associated binder through a curing oven to cause cure of the binder and bonding by the cured binder of the fibers to one another at points of contact, the improvement of using as the binder resin a phenol-aldehyde condensate produced by condensing an aldehyde with phenol in a mole ratio of at least 1.5:1 in the presence of a metal-base condensing agent and water until substantially all of the phenol-aldehyde condensate is water-insoluble at a pH of about 7.5, and forming an emulsion of the phenol-aldehyde condensate by adding to the reaction mixture an amount of an emulsifier which amount is effective to form the emulsion and sufficient acid to adjust the pH thereof to one in the range of about 7–8 before condensation has proceeded sufficiently far that precipitation of the condensate occurs when the pH thereof is 9 and higher wherein the emulsifier is oxyethylated straight chain phenols, salts of polycarboxylic acids, free acid of organic phosphate esters, pentasodium salt of diethylenetriamine, pentaacetic acid, polyoxyethylenealkylarylethers, poyoxyethylene sorbitan monolaurate, or sodium salt of a polymeric carboxylic acid.

2. A method as claimed in claim 1 wherein the emulsifier is selected from the group consisting of polymethacrylate and coconut fatty acid amine.

* * * * *